Sept. 7, 1926.  A. Y. DODGE  1,598,807

BRAKING SYSTEM

Filed May 22, 1926

INVENTOR
ADIEL Y. DODGE
BY
*M. W. McConkey*
ATTORNEY

Patented Sept. 7, 1926.

1,598,807

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKING SYSTEM.

Application filed May 22, 1926. Serial No. 110,845.

This invention relates to brakes, and is illustrated as embodied in an automobile chassis having brakes on all four wheels. An object of the invention is to arrange the operating parts to balance or neutralize the forces tending to bend or deflect the brake-applying cross-shaft, preferably in a manner to equalize the front brakes against the rear brakes, thus permitting the use of a lighter shaft.

When such equalization is desired, there may be two arms extending in opposite directions from the shaft, one fixed on the shaft and the other loose on the shaft, and which are connected at their ends to the ends of an equalizer bar operated by the pedal or the like. The loose arm has between its ends a brake-applying connection, such as a link operating the rear brakes, which serves as a fulcrum so that the loose arm is operated as a lever tending to deflect the cross-shaft in the opposite direction, and in an equal amount, with respect to the deflection due to the force acting on the other brakes. Whether or not the brakes are so equalized, the present invention has to do with the point at which the rear-brake connection engages its arm to operate it as described to balance the shaft-bending force due to the application of the front brakes.

The above and other objects and features of the invention, including various novel and desirable combinations of the parts, will be apparent from the following description of one illustrative embodiment shown in the accompanying drawing, in which.

Figure 1:
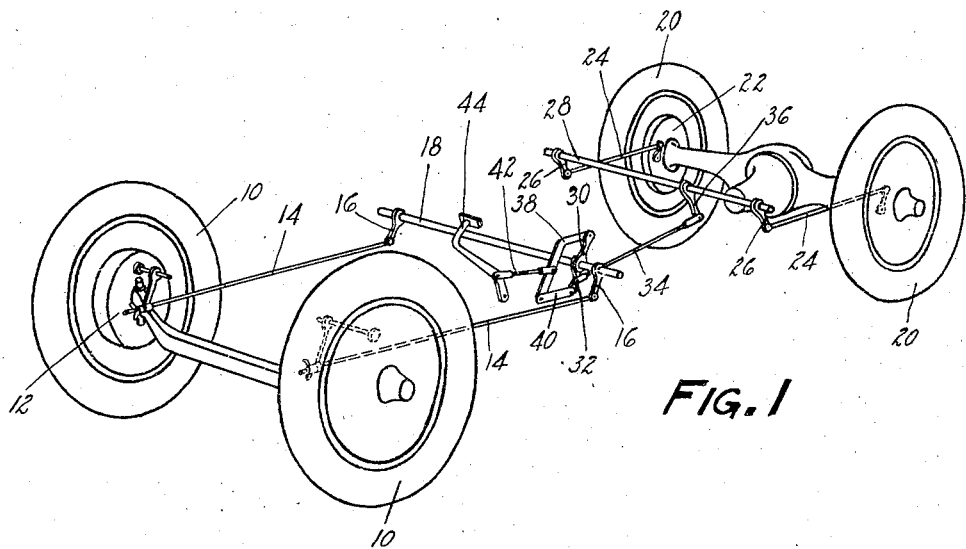
Figure 1 is a perspective view of part of an automobile chassis.
Figure 2:
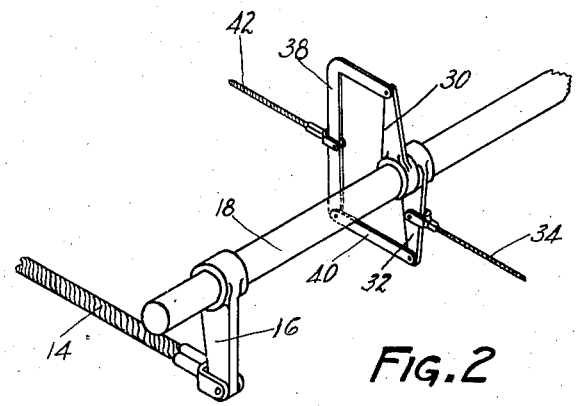
Figure 2 is a perspective from a different point of view, and on a larger scale, of the above-described arms.
Figure 3:
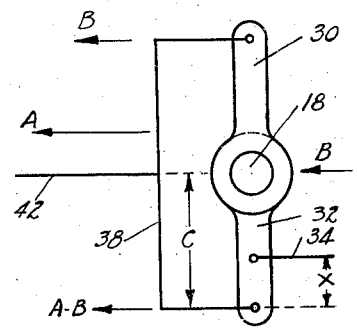
Figure 3 is a diagram representing the arms in side elevation and showing the balancing of the forces.

In the arrangement selected for illustration, the chassis includes front wheels 10 having brakes 12 operated by connections 14 from arms 16 on a cross-shaft 18, together with rear wheels 20 having brakes 22 operated by connections 24 from arms 26 on a cross-shaft 28. Cross-shafts 18 and 28 are journalled in suitable supports on the chassis frame (not shown).

On cross-shaft 18, in this particular embodiment, are arranged two oppositely-extending arms 30 and 32. Arm 30 is fixed on the shaft and operates it to apply the front brakes. Arm 32 is loosely sleeved on the shaft, and between its ends is connected by means such as a tension member 34 to an arm 36 on shaft 28.

An equalizer bar 38 is connected at its ends to the ends of arms 32 and 30, the connection at one end preferably being by a shackle link 40. At one end the bar may have an angular connecting portion generally parallel to the link 40, so that the body of the bar may be more nearly vertical. Between its ends, and preferably at its effective center, bar 38 is engaged by an operating device such as a tension connection 42 from the pedal 44.

The present invention has to do with the point at which connection 34 or its equivalent engages arm 32. If we designate the force applied through the connection or device 42, to all the brakes, from the pedal, as the vector "A", then a certain amount "B" is applied to the end of arm 30 to apply the front brakes. All of the amount indicated by vector "B" acts to deflect shaft 18 forwardly, there being no mechanical advantage so far as the shaft-bending force is concerned. This leaves a force A—B acting on the end of arm 32 to apply the rear brakes, and also tending to rock arm 32 about connection 34 as a fulcrum to bend shaft 18 rearwardly, or in the opposite direction from bending force "B". The exact ratio of "B" to "A—B" depends partly on the hookup used, and partly on the ratio of forces desired on the front and rear brakes, but in any given case this ratio is a fixed, known quantity.

The force "A—B," regarded as rocking arm 32 about connection 34 as a fulcrum, acts on shaft 18 with a force equal to "A—B" multiplied by $$\frac{X}{C-X},$$

where "X" is the distance from fulcrum 34 to the effective end of arm 32. This is the force which we wish to be equal and opposite to "B," so it may be equated against "B," giving:

$$B = \frac{(A-B)X}{C-X}$$

or:

$$\frac{A-B}{B} = \frac{C-X}{X}$$

From this formula, in any given case, the distance "X" is readily determined.

While one illustrative embodiment has been described in detail, it is not my intention to limit the scope of the invention to that particular embodiment, or otherwise than by the terms of the appended claims.

I claim:

1. Brake-operating mechanism comprising, in combination, two sets of brakes, a shaft applying one set of the brakes, a pair of arms extending in opposite directions from the shaft and one of which is fixed on the shaft and the other of which is loose on the shaft, a bar connected at its ends to the ends of the two arms, an operating device acting on said bar between its ends, and an operating device for the other set of brakes connected to the loose arm between its ends at a point determined by the following formula, in which "A" indicates the force acting on the operating device to apply all the brakes, "B" indicates the brake-applying force acting on the shaft and tending to deflect the shaft in one direction, "C" indicates the effective length of said loose arm, and "X" indicates the distance from the effective end of said loose arm to the connection to the said other set of brakes, the formula being:

$$\frac{A-B}{B} = \frac{C-X}{X}$$

2. Brake-operating mechanism comprising, in combination, two sets of brakes, a shaft applying one set of the brakes, an arm on the shaft, an operating device tending to rock the shaft to apply one set of brakes and acting on said arm to apply the other set of brakes, and an operating device for the said other set of brakes connected to the arm between its ends at a point determined by the following formula, in which "A" indicates the force acting on the operating device to apply all the brakes, "B" indicates the brake-applying force acting on the shaft and tending to deflect the shaft in one direction, "C" indicates the effective length of said arm, and "X" indicates the distance from the effective end of said arm to the connection to the said other set of brakes, the formula being:

$$\frac{A-B}{B} = \frac{C-X}{X}$$

In testimony whereof, I have hereunto signed my name.

ADIEL Y. DODGE.